United States Patent [19]

Lemmon

[11] 4,236,723
[45] Dec. 2, 1980

[54] HIP CART

[76] Inventor: John A. Lemmon, 3049 Halcyon Ct., Berkeley, Calif. 94705

[21] Appl. No.: 949,353

[22] Filed: Oct. 6, 1978

[51] Int. Cl.³ .............................................. B62B 1/12
[52] U.S. Cl. .................................................. 280/1.5
[58] Field of Search ................... 280/1.5, 47.17, 47.27, 280/638, 645, 648; 172/353, 370

[56] References Cited

U.S. PATENT DOCUMENTS

| | | | |
|---|---|---|---|
| 570,444 | 11/1896 | Armstrong | 280/1.5 |
| 1,727,008 | 9/1929 | Fauver | 280/1.5 |
| 2,140,688 | 12/1938 | Cohn | 280/1.5 X |
| 2,613,953 | 10/1952 | Giovannoni | 280/1.5 X |
| 3,328,043 | 6/1967 | Johnson | 280/1.5 |
| 3,926,448 | 12/1975 | Reichard | 280/1.5 |

Primary Examiner—John A. Pekar
Attorney, Agent, or Firm—Townsend and Townsend

[57] ABSTRACT

The invention disclosed is a cart designed to carry a load and to be pulled behind a user when strapped to the user's waist or hips. Normally the cart contains a generally upright, adjustable-length load-support frame. A load-supporting means supports the load on the frame. A pair of wheels is attached to the distal end of the frame, and a pair of rigid, generally horizontal arms extends from the frame's proximal end out toward the user at an adjustable angle. A means for attaching the cart to the user's waist, preferably a strap, is located at the proximal end of the arms.

In operation, a piece of luggage or other load is placed on the cart's frame and supported there by the load-supporting means which is usually a platform-like structure. The strapping means is then strapped to the user's lower torso so that the cart is positioned behind the user, its wheels resting directly on the ground. The user can then tow the load and cart behind him by walking or even running forward. The cart is designed so that, by adjusting the various adjustable features, the center of gravity is located only a small distance from the wheels, between the user and the wheels, for maximum carrying ease and comfort.

6 Claims, 3 Drawing Figures

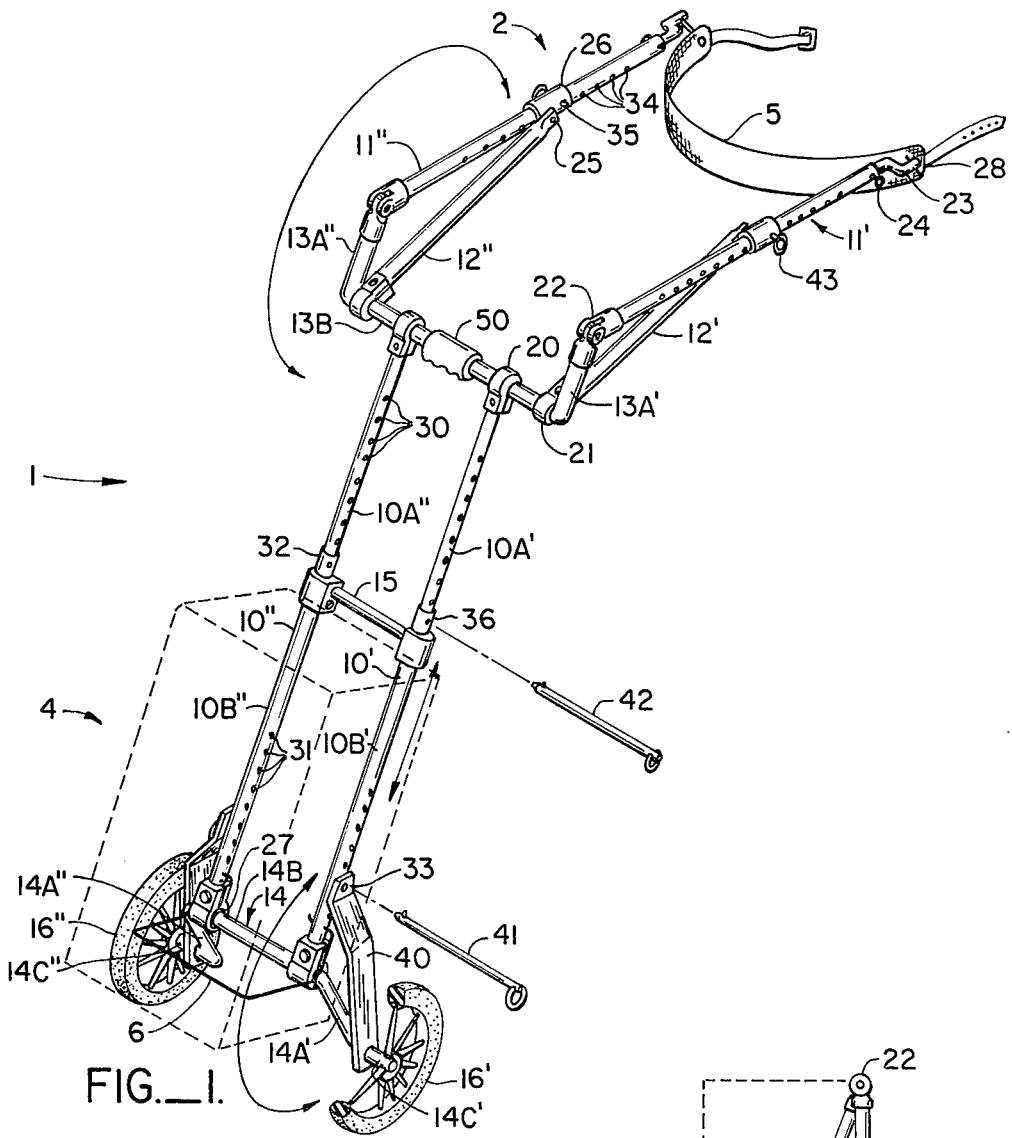
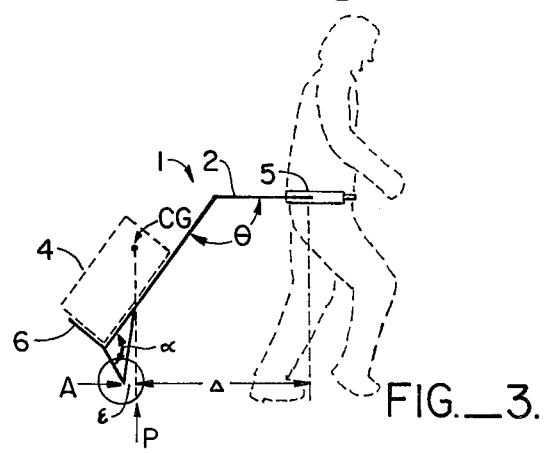
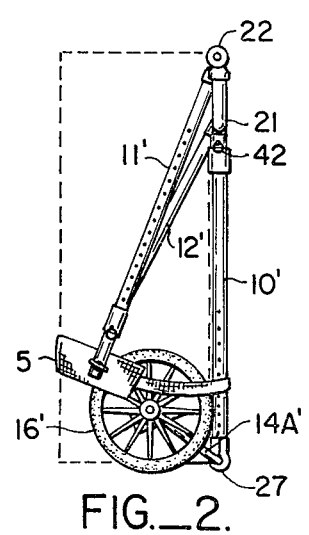
FIG._1.
FIG._3.
FIG._2.

HIP CART

SUMMARY OF THE INVENTION

The present invention is a cart designed to carry a load and to be pulled behind a user when attached to the user's waist or hips. Normally, the cart contains a generally upright, adjustable-length load-support frame, the "proximal end" being positioned closer to the user than the "distal end". (Throughout this specification and the claims, the words "proximal" and "distal" will be used to refer to the part of the cart either "proximal" or "distal" to the user when the cart is attached to the user's waist or hips and pulled behind the user.) A load-supporting means supports the load on the frame. A pair of wheels is attached to the distal, lower end of the frame, and a pair of rigid, generally horizontal arms extends from the frame's proximal end out toward the user at an adjustable angle. Means for attaching the cart to the user's waist, preferably a strap, is located at the proximal end of the arms.

In operation, a piece of luggage or other load is placed on the cart's frame and supported there by the load-supporting means which is usually a platform-like structure. The attaching means is then strapped to the user's lower torso so that the cart is positioned behind the user, its wheels resting on the ground. The user can then tow the load and cart behing him by walking or even running forward.

Thus, the cart supports its load between the wheels and the user, similar to a wheelbarrow. Because the cart is strapped to the user at the proximal ends of the arms, it provides adequate heel clearance for the user; his heels do not bump or contact the cart while he is towing it.

Additionally, because the frame length and arm angle are adjustable, the center of gravity of the cart can be adjusted so that the total weight of the cart (plus load when it carries a load) locates very close to the wheels for maximum lever advantage. Accordingly, the user need not himself bear a heavy burden even if the load itself is relatively heavy. The small portion of weight not borne by the wheels is supported by the user at the strap. This minimizes discomfort to the user since the strap remains comfortably seated when the cart is towed, rather than bouncing about in an uncomfortable and irritating manner, and very little pressure is applied to the user. Overall the cart provides an especially convenient and comfortable means for a user to carry a load without himself supporting a great burden.

BRIEF DESCRIPTION OF THE DRAWINGS

FIG. 1 shows the preferred embodiment of the present ivnention is perspective, with one wheel shown in section and certain parts exploded.

FIG. 2 is a side elevation of the embodiment of FIG. 1.

FIG. 3 is a side view schematic diagram of the cart in use.

DESCRIPTION OF THE SPECIFIC EMBODIMENTS

The cart of the present invention in one of its broadest embodiments contains a generally upright, adjustable-length, load-support frame with a substantially planar configuration. A load-supporting means supports the load on the frame. A pair of wheels is attached to the distal end of the frame, and a pair of rigid, generally horizontal arms extends from the frame's proximal end out toward the user at an adjustable angle. A means for attaching the cart to the user's waist, preferably a strap, is located at the proximal end of the arms.

Referring now to the embodiment of the present invention shown in FIG. 3, the general structure of the cart can be seen. The load-support frame 1 of adjustable length is illustrated with wheels attached to its distal end and a load 4 supported on its distal side by a supporting means 6 in the form of a platform-like structure. When the wheels are attached to the frame in the manner shown, an angle $\alpha$ is formed between the frame and wheels which is adjustable in the preferred embodiment. Arms 2 are attached to the proximal end of frame 1 and extend toward the user in a generally horizontal position. An adjustable, normally obtuse angle $\theta$ is formed between the arms and the proximal side of the frame. A strap 5 connects the proximal end of the arms to the user's waist or hips.

The cart when supporting a load has a certain center of gravity CG. This center of gravity is shown vertically above a point P between wheel axles A and the person. The lateral distance between point P and the axles is labelled $\epsilon$. The lateral distance between point P and the person is labelled $\Delta$. $\epsilon$ is much smaller than $\Delta$, but is not negative.

The particular advantages of the cart's structure are numerous. First, as can be seen from FIG. 3, there is adequate clearance for the user's heels; his heels do not bump or contact the cart while he tows it.

Second, the location of the center of gravity of the cart provides considerable advantages. Because $\epsilon$ is smaller than $\Delta$, the cart provides a very favorable lever advantage, and the primary portion of the weight of the cart and load is supported by the wheels, rather than by the user. Thus the user need not bear a heavy burden even if the load itself is heavy. Because $\epsilon$ is smaller than $\Delta$ but not negative, the small portion of the weight borne by the user exerts a downward, rather than upward force. This small downward force causes the strap to remain comfortably seated on the user's waist or hips rather than lifting up or bouncing, thereby irritating and possibly chafing the user when he pulls the cart.

Naturally, when the load 4 varies in size or weight, the center of gravity CG, and point P, will laterally shift. Because the frame 1 is adjustable in length, and because angle $\theta$ is adjustable, however, the cart can be adjusted with each load so that $\epsilon$ is small relative to $\Delta$, but not negative, and so that the arms extend in a generally horizontal direction. As a result, the user can adjust the cart so that the weight distribution for any load is of maximum comfort, with the primary portion of the weight supported at the carts distal end, and a small portion supported by the user. In the preferred embodiment, angle $\alpha$ is also adjustable to aid in this adjustment of the weight distribution.

Also in the preferred embodiment of the cart, the arms 2 rotate to the distal side of the frame, so that the user can push the cart by a handle on the proximal end of the frame without interference from the arms. Additionally, the wheels can be rotated toward the distal side of the frame so that the cart collapses and can be conveniently stored away, with or without the load attached. The cart is preferably constructed of lightweight, inexpensive materials such as aluminum or even plastic. The preferred embodiment of the cart is illustrated in FIG. 1.

Referring now to FIG. 1, the frame contains two parallel rods generally labelled 10' and 10". Each rod consists of two sections, a hollow distal rod portion, and a proximal rod portion narrower in diameter than the distal portion. The proximal portions 10A' and 10A" can be slidably inserted into the distal portions 10B' and 10B".

The two rods 10' and 10" are joined at their distal ends by a lateral spacer. Another lateral spacer 15 joins the two distal rod portions 10B' and 10B" near their upper ends. The width of the frame formed by rods 10' and 10" and lateral spacer 15 is preferably six inches or more.

Each distal rod portion 10B' and 10B" contains a series of apertures 31. Each set of apertures in the series consists of two aligned apertures, one on the inner side and one on the outer side of each rod. Each set of apertures is also aligned with the corresponding set of apertures in the other rod. An additional set of apertures 36, similarly aligned, is located in distal rod portions 10B' and 10B" above spacer 15. Each proximal rod portion 10A' and 10A" also contains a series of apertures 30 aligned in the same manner as the apertures of series 31.

Aperture series 30 and aperture set 36 allow the frame to be adjusted to varying lengths. To fix the frame at the desired length, proximal rod portions 10A' and 10A" are slid into distal rod portions 10B' and 10B" until the frame is approximately the desired length. Apertures 36 are then aligned with the nearest set of apertures in series 30. Pin 42 is then inserted through the aligned apertures to secure the frame at the desired length.

The uppermost lateral spacer in the preferred embodiment, 13B, extends beyond the lateral plane of the frame and has two legs 13A' and 13A", one attached to each end of the spacer. These legs 13A' and 13A" are parallel to the rods 10' and 10". A handle 50 is also attached to spacer 13B; when the arms are rotated to the distal side of the frame as shown in FIG. 2, the user can push the cart by this handle over the ground without interference from the arms.

Referring now to the distal portion of the preferred embodiment, two wheels 16' and 16" are rotatably attached to each end of lateral spacer 14, which serves as an axle. Spacer 14 extends beyond the lateral plane of the frame and is crank-shaped at each end. Lateral spacer 14 is preferably such that the wheels are 12 to 14 inches apart.

Braces 40 which are rotatably attached to the ends of spacer 14 can be utilized to adjust the angle $\alpha$ (shown in FIG. 3) between spacer 14 and the proximal side of frame 1. Each of the two braces 40 contains an aperture 33 near its upper end. These apertures 33 are aligned with one set of apertures in series 31 selected to provide the desired angle. Pin 41 is then inserted through the aligned apertures to secure the wheels 16' and 16" in position with selected angle $\alpha$. This variability in angle $\alpha$ aids the user in adjusting the center of gravity of the cart as illustrated in FIG. 3.

Additionally, the preferred brace arrangement provides a certain amount of resiliency in the connections between the wheels 16' and 16" and the frame 1. The braces, particularly when they have the preferred modified Z shape shown, tend to flex in directions parallel to the axle and parallel to the braces themselves. Additionally, the pin-aperture arrangement securing the braces to the frame, as well as the rotatable connection between spacer 14 and the braces tend to allow small amounts of brace rotation relative to the frame and axle, plus transverse movement of the braces along the axle and along the pin itself. As a result, shocks occurring when the cart is towed behind the user over the ground are at least in part absorbed at this resiliently articulated connection created by the brace-frame-axle arrangement, rather than transmitted to the remainder of the cart and ultimately to the strap. Consequently, surge force is transmitted to the user is minimized.

The cart as illustrated in FIG. 1 further contains two rigid arms 11' and 11" having a series of aligned apertures 34. The distal end of each arm is rotatably mounted at a joint 22 to the proximal end of one of legs 13A' and 13A". This preferred embodiment also contains bracing bars 12' and 12", each of which is rotatably attached to spacer 13B by means of a sleeve 21. The proximal ends of bracing bars 12' and 12" are pivotally mounted at axles 25 to sleeves 26. Each sleeve 26 surrounds one of the arms 11' and 11" and contains a set of aligned apertures 35. The bracing bars can then be utilized to adjust and hold arms 11' and 11" at the desired angle $\theta$ (shown in FIG. 3); apertures 35 are aligned with the desired set of apertures in series 34 and pin 43 is inserted through the aligned apertures to hold the arms and bracing bars at the selected position. The user can thus adjust angle $\theta$ as well as the length of the frame to vary the center of gravity of the cart as illustrated in FIG. 3.

At the proximal end of each arm is attached means 5 for strapping the cart to the user's waist. As illustrated, this strap 5 is attached to arms 11' and 11" by means of extensions 23 which slide into arms 11' and 11". Each extension 23 is held in arms 11' and 11" by a pin 24, and the strap 5 is attached to each extension by a pin 28 which passes through apertures in the extension and an aperture in the strap. The strap 5 can be detachable so that the cart can be pushed as well as towed.

Finally, the load-supporting means is illustrated in FIG. 1 as a platform-like structure 6 extending from the distal end of the distal side of the frame. A load 4 is shown supported on platform 6 and the frame.

Referring now to FIG. 2, it can be seen that the structure of the preferred embodiment is particularly advantageous because the cart can be conveniently collapsed. Proximal rod portions 10A' and 10A" are slid entirely into distal rod portions 10B' and 10B" respectively and secured by pin 42 which is extended through apertures 36 and the uppermost of apertures 30 in upper rod portions 10A' and 10A". When the cart is collapsed in this form, its total length is preferably about 22 inches.

Also bracing bars 12' and 12" are rotated at sleeves 21 to the distal side of the frame. (The load itself can still be retained on the cart while the cart is in this collapsed form.) Additionally, arms 11' and 11" are rotated at joints 22 to the distal side of the frame. Finally, spacer 14 is rotated upwards and backwards at sleeves 27 so that wheels 16' and 16" rest at the distal side of the frame. In this collapsed form, the cart can be conveniently stored away. It can, for example, when carrying luggage for an airplane flight, be stored under the user's-seat in the plane with the luggage still on it. After the flight, the wheels can be reattached at the desired angle for use and the cart pushed or pulled by the handle until it is convenient for the user to attach it to his body. At that time, the arms and braces are attached at the desired angles, the frame extended to the desired height, the strap attached to the user's hips, and the luggage towed away with convenience.

Naturally, the above description is not to be taken by way of limitation, and it will be obvious that many variations in the illustrated structure can be made within the scope of the invention.

What is claimed is:

1. A cart comprising:
   (a) a load support frame having a proximal end and a distal end and comprised of two generally upright, spaced, parallel, adjustable-length rods and a plurality of lateral spacers fixedly mounted between said upright rods;
   (b) means for supporting a load on said frame;
   (c) a pair of wheels mounted by an axle on the distal end of said frame;
   (d) a pair of spaced parallel rigid arms adjustably mounted at the proximal end of said frame at an adjustable angle $\theta$ to said frame, said arms having a proximal end and a distal end;
   (e) means for connecting the proximal ends of said arms to the waist of a person,
   so that for a given load, the lengths of said rods as well as said angle $\theta$ may be adjusted to cause the center of gravity of said cart plus its load to lie vertically above a point located between said axle and said person, to cause said arms to extend in a generally horizontal direction, and to cause the lateral distance between said point and said axle to be small relative to the lateral distance between said point and said person.

2. A cart according to claim 1 wherein said wheels are attached to said frame by a resiliently articulated connection so that shocks occurring when the cart is towed behind said user over irregular ground are at least partially absorbed at this connection to minimize surge forces transmitted to the user.

3. A cart according to claim 1 wherein:
   (a) the lowermost lateral spacer extends beyond the lateral plane of said frame and serves as said axle, said lowermost lateral spacer being crank-shaped at each end and being rotatably adjustable relative to said frame; and
   (b) the cart further comprises:
      a pair of braces, said braces being rotatably mounted at one end on the crank-shaped portion of said lowermost lateral spacer; and
      means for securing the other ends of said braces at a plurality of positions on said rods,
      so that the position of said axle can be adjusted relative to the frame.

4. A cart according to claim 1 wherein said frame has a proximal side and a distal side and said arms are rotatable relative to the frame to a position on the distal side of said frame so that the cart can be pushed by said person by means of the proximal end of said frame without interference from said arms.

5. A cart according to claim 1 or 4 wherein said means for connecting the proximal end of the arms to the person is detachable.

6. A cart according to claim 3 wherein:
   (a) said frame has a proximal side and a distal side;
      the uppermost lateral spacer of said frame extends beyond the lateral plane of said frame and has a leg extending from each end, each leg being aligned parallel to said rods, and having a proximal end and a distal end;
      the means for supporting a load on said frame is a platform-like structure positioned at the distal end and on the distal side of the frame;
      the arms are mounted at the proximal ends of said legs, and are rotatable relative to the frame to a position on the distal side of said frame; and
   (b) said cart further comprises:
      two bracing bars, one end of each bracing bar rotatably mounted relative to the frame on the uppermost lateral spacer of the frame;
      means for securing the other end of each bracing bar to a plurality of positions on the nearest of said arms.

* * * * *